United States Patent [19]

Colgate et al.

[11] Patent Number: 5,235,225
[45] Date of Patent: Aug. 10, 1993

[54] LINEAR ELECTROSTATIC ACTUATOR WITH MEANS FOR CONCATENATION

[75] Inventors: James E. Colgate, Evanston; Mark E. Axland, Glenview, both of Ill.

[73] Assignee: Northwestern University, Evanston, Ill.

[21] Appl. No.: 575,965

[22] Filed: Aug. 31, 1990

[51] Int. Cl.$^5$ ............................................. H02K 41/00
[52] U.S. Cl. ...................................... 310/12; 310/17; 310/22; 310/309; 318/135
[58] Field of Search ................ 310/308, 309, 12, 310, 310/15, 40 MM, 112, 17, 22; 318/135

[56] References Cited

U.S. PATENT DOCUMENTS

| | | | |
|---|---|---|---|
| 2,893,041 | 7/1959 | Schafer | 310/12 |
| 2,975,307 | 3/1961 | Schroeder | 310/309 |
| 3,805,511 | 4/1974 | Adler et al. | |
| 3,838,299 | 9/1974 | Elkuch | |
| 4,205,362 | 5/1980 | Butterfield | |
| 4,520,375 | 5/1985 | Kroll | |
| 4,642,504 | 2/1987 | Jacobsen | |
| 4,689,529 | 8/1987 | Higuichi | 310/12 |
| 4,736,127 | 4/1988 | Jacobsen | |
| 4,754,185 | 6/1988 | Gabriel et al. | |
| 4,760,302 | 7/1988 | Jacobsen | |
| 4,767,973 | 8/1988 | Jacobsen et al. | |
| 4,789,803 | 12/1988 | Jacobsen et al. | |
| 4,814,657 | 3/1989 | Yano | 310/309 |
| 4,922,143 | 5/1990 | Gosdowski | 310/12 |

FOREIGN PATENT DOCUMENTS

| | | | |
|---|---|---|---|
| 0972380 | 6/1959 | Fed. Rep. of Germany | 310/309 |
| 0136978 | 6/1988 | Japan | 310/309 |
| 0694962 | 10/1979 | U.S.S.R. | 310/309 |
| 0744877 | 6/1990 | U.S.S.R. | 310/309 |

OTHER PUBLICATIONS

Jacobsen, et al., "The Wobble Motor: An Electrostatic Planetary-Armature, Microactuator", IEEE, (no month) 1989, pp. 17–24.
Fujita, "Electrostatic Actuators for Micromechatronics", IEEE, (no month) 1987, 10 pages.
Trimmer, et al., "An Operational Harmonic Electrostatic Motor," IEEE, (no month) 1989, pp. 13–16.

Primary Examiner—R. Skudy

[57] ABSTRACT

Miniaturized linear electrostatic motor comprising a plurality of parallel stators and a flexible rotor disposed between adjacent stators. The stators may be fabricated by depositing a plurality of conductive electrodes on each facing surface of the stator or the electrodes may alternatively be placed on the flexible rotor element. The electrodes are selectively energized by a commutating circuit in a manner to effect movement of the rotor relative to the stator in a perpendicular to parallel motion. The electrostatic motor is particularly suitable for fabrication using photo-lithographic techniques and the formation of multi-layered, concatenated motor structures.

19 Claims, 5 Drawing Sheets

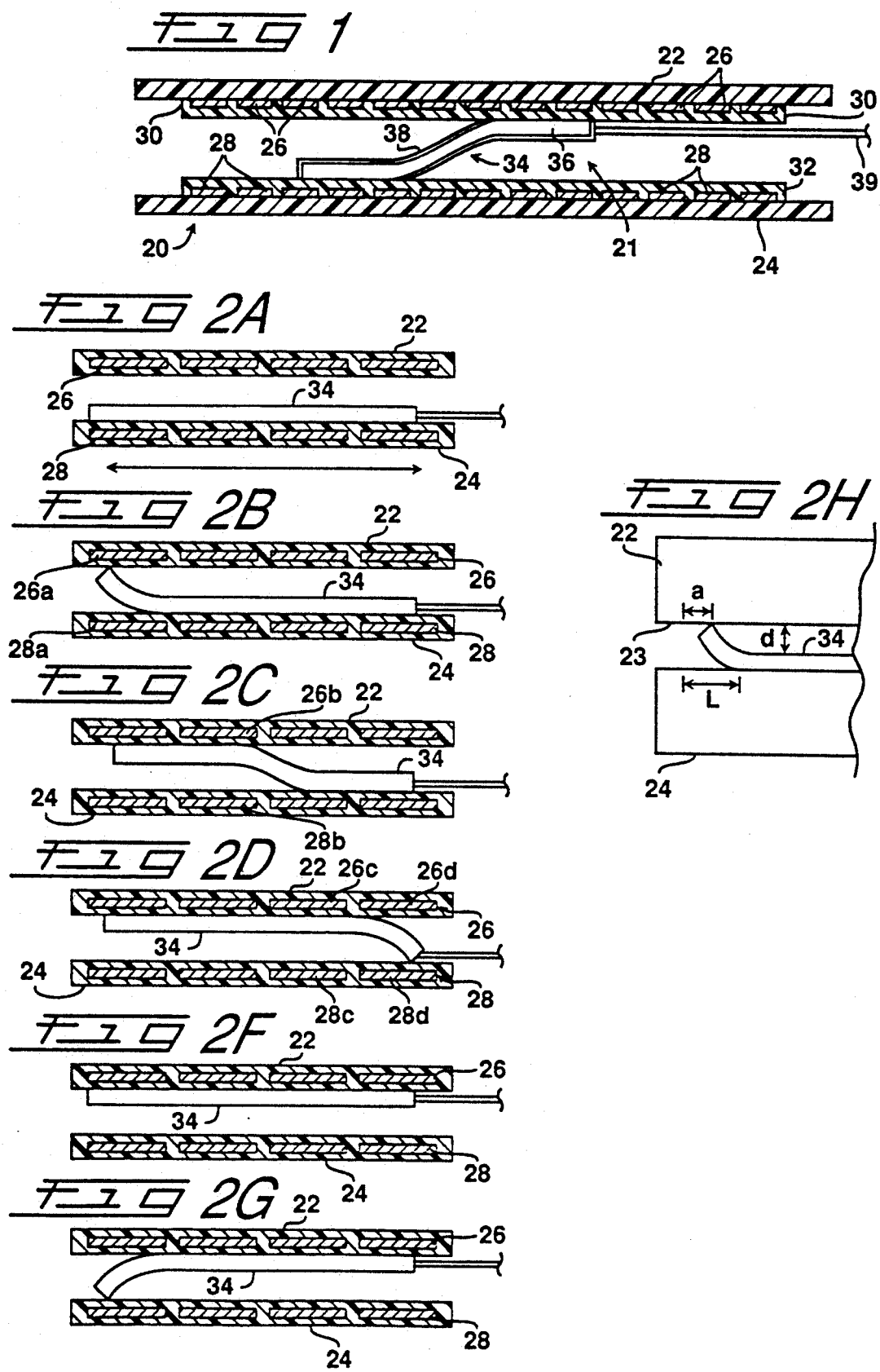

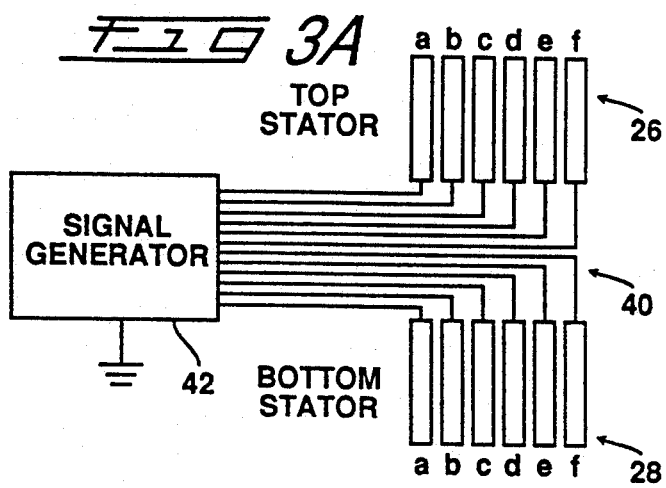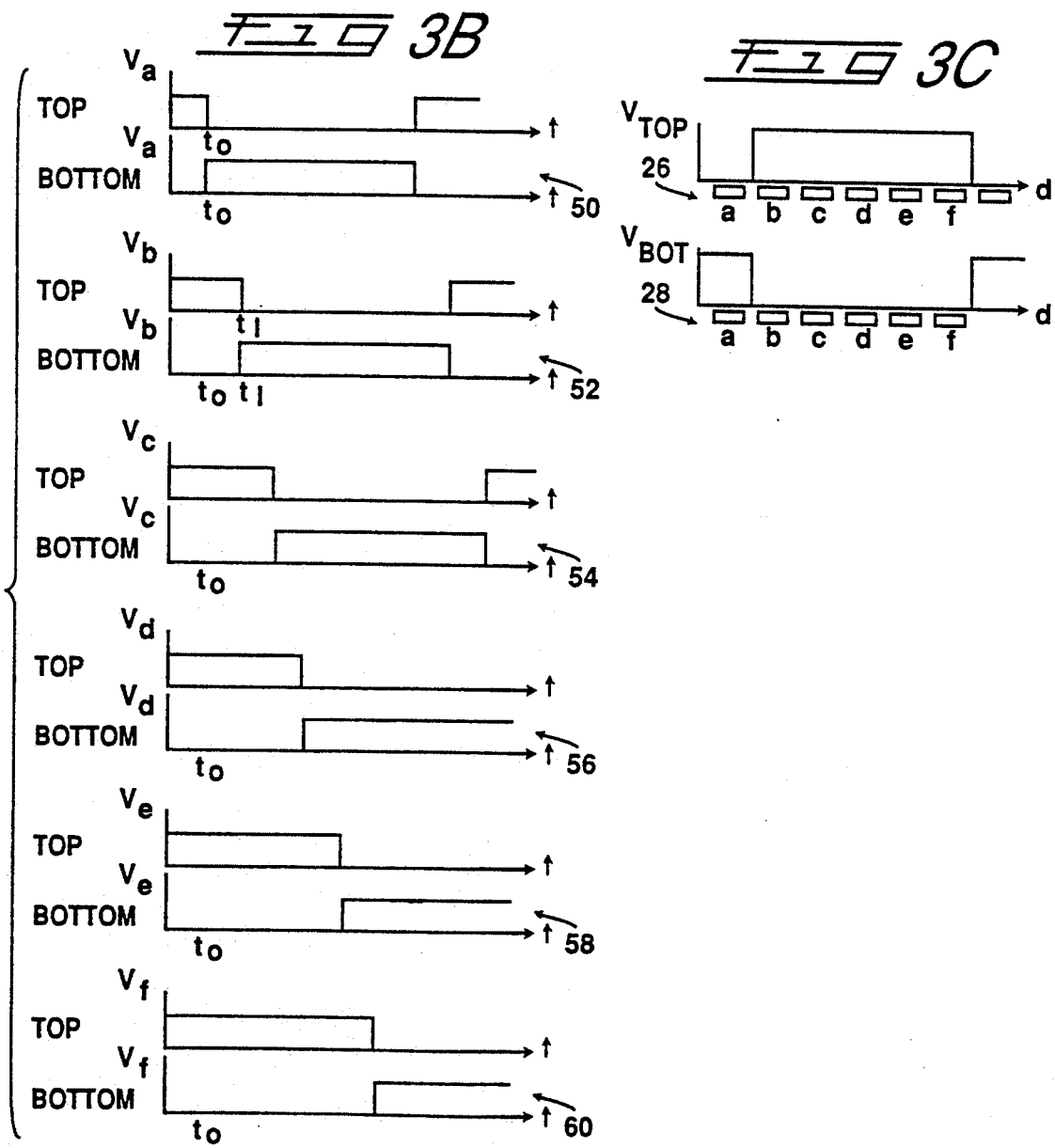

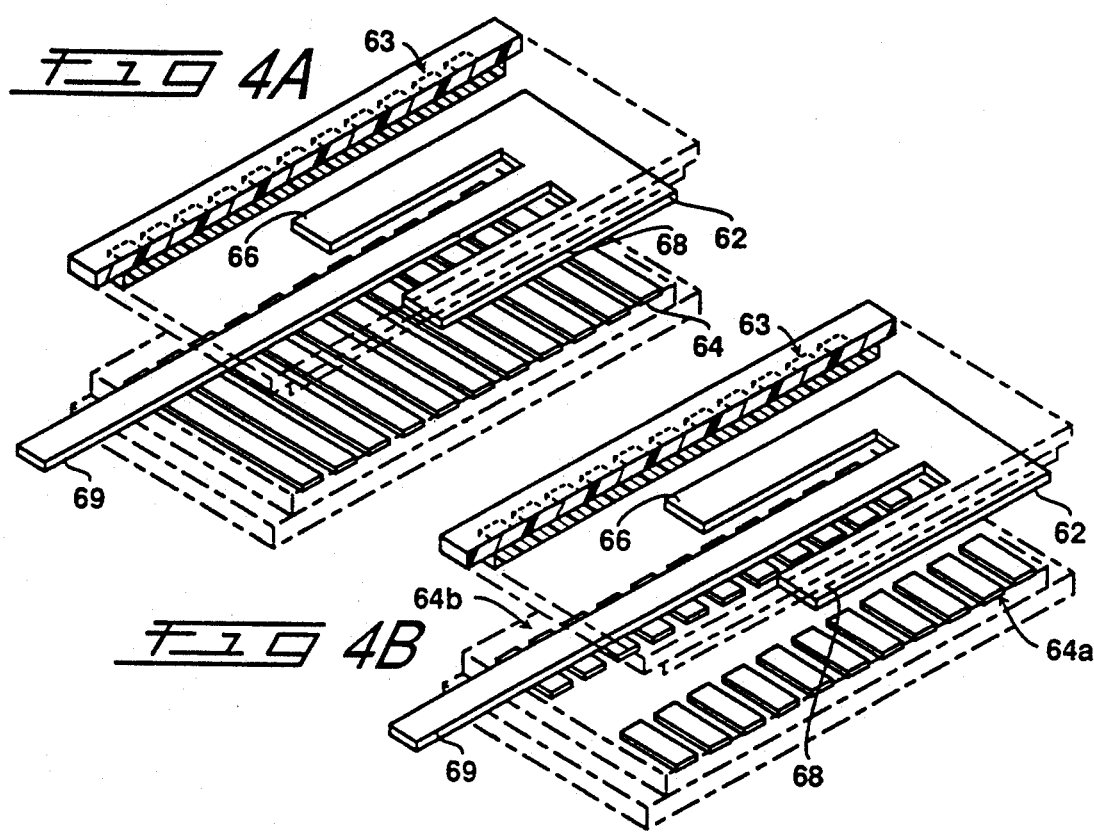
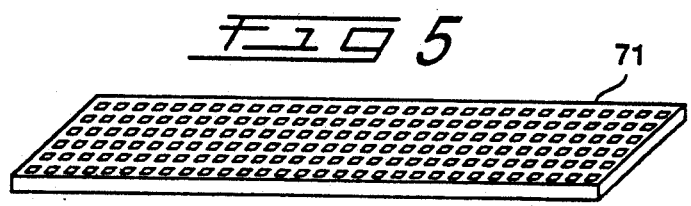
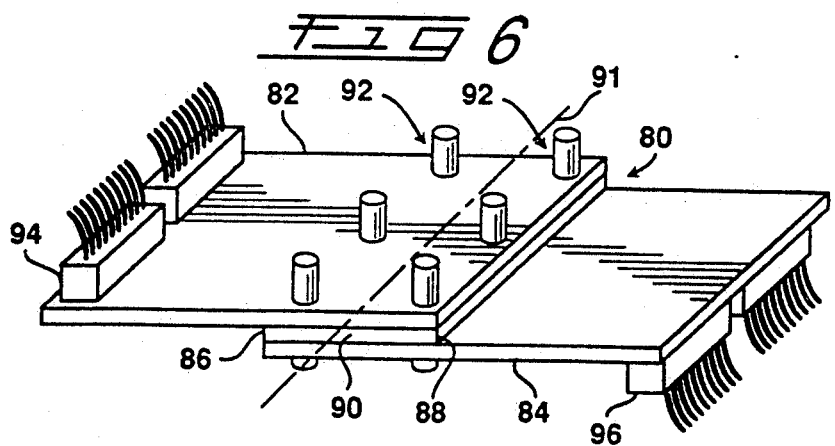

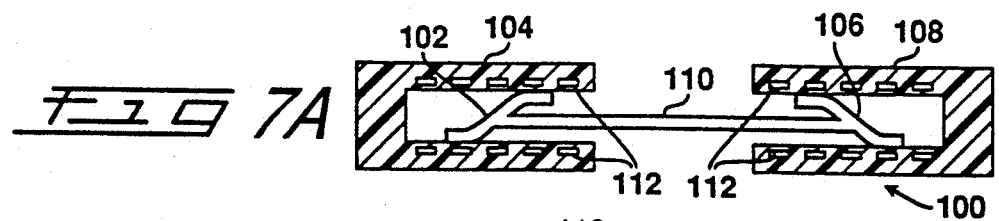
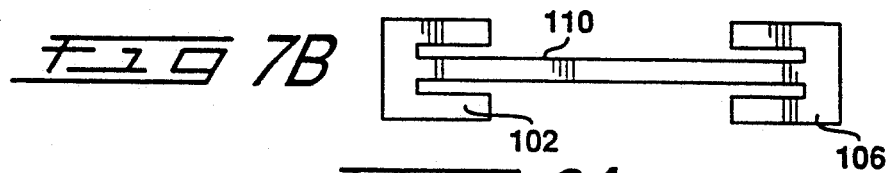
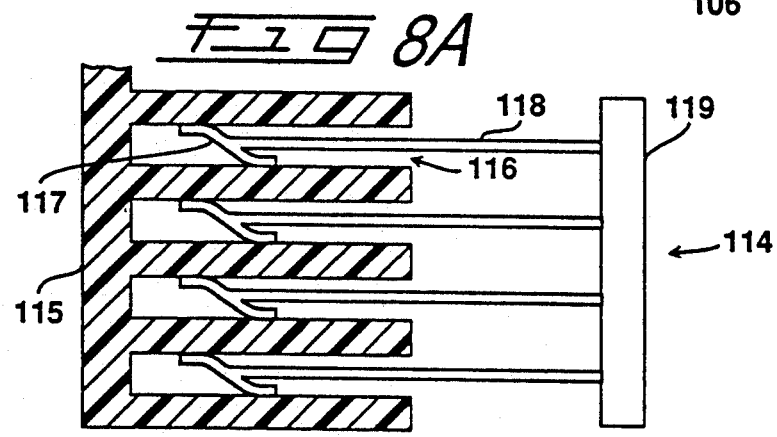
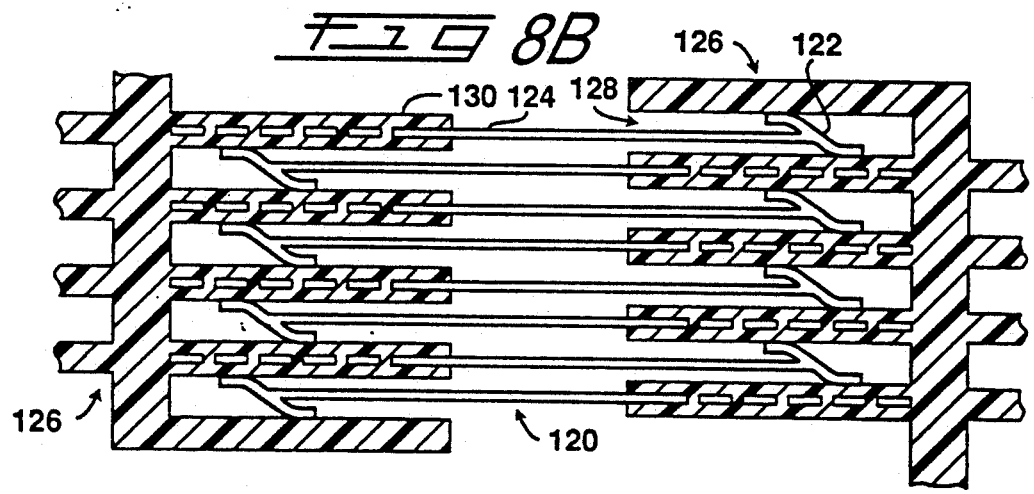
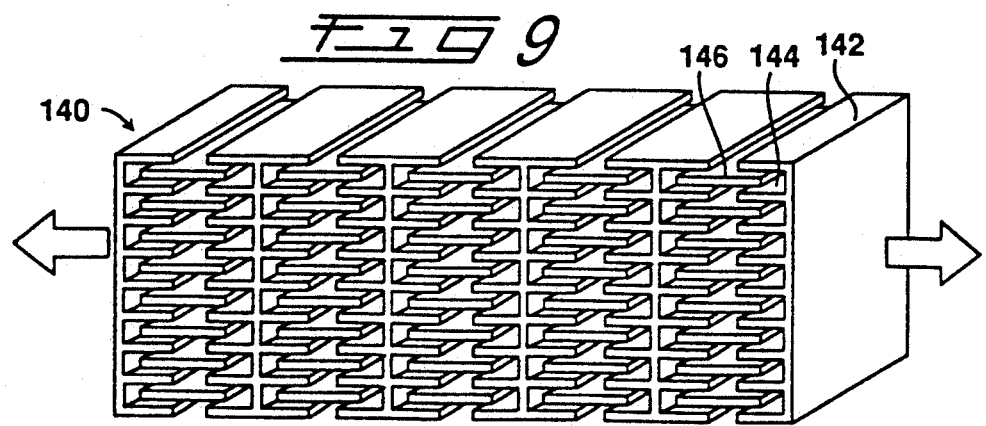

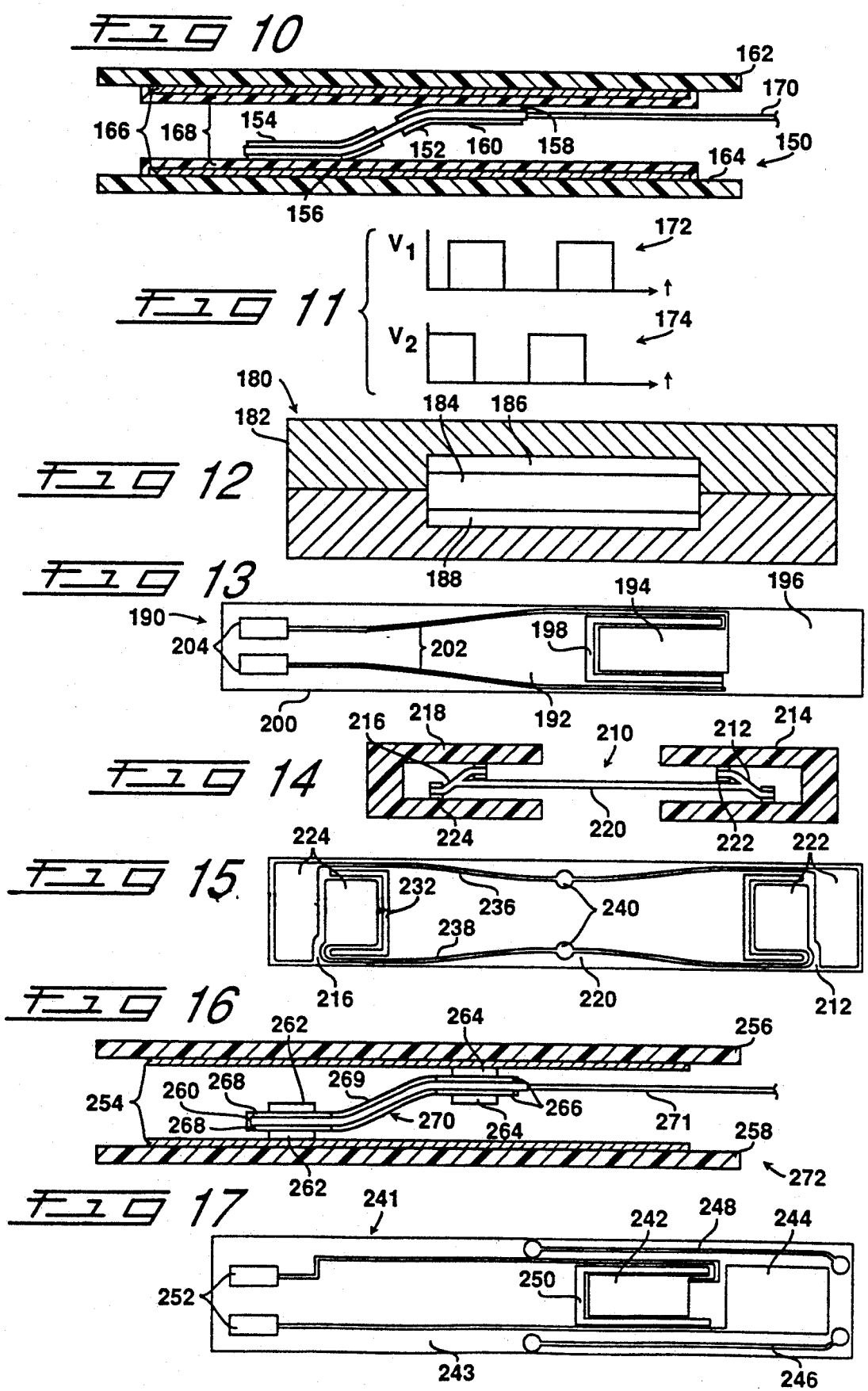

LINEAR ELECTROSTATIC ACTUATOR WITH MEANS FOR CONCATENATION

This invention relates generally to the field of linear electric motors, in particularly, to miniature and micro linear electric actuators which may be fabricated using photo-lithographic techniques and which are suitable for construction into multilayer, concatenated actuator structures.

There is a wide variety of automated systems presently in use such as appliances, automobiles, etc., each requiring some type of actuator. The most common type of actuator is the electric motor. However, conventional electric motors have a low force/weight ratio and are thus too large and heavy for many applications in such fields as medical instrumentation, clean room instrumentation, spacecraft, and robotics. As a result, the need for small sized, forceful actuators has motivated development of miniature and microelectromechanical actuators. Such actuators can be fabricated using micro electronic fabrication techniques and other miniaturization techniques to construct actuators with dimensions as small as a few microns. Such micro electromechanical devices provide the opportunity to take advantage of scaling laws inherent in physical principles in order to realize improvements in force-to-weight and force-to-size ratio over comparable macro devices.

Such miniaturized actuators are particularly of interest in the field of robotics because robot actuators must often carry the weight of the actuator itself. Thus, muscle-like actuators for such robotic devices as well as prosthetic devices have become of great interest. One prior art approach to such actuators utilizes linear motors in which a number of small linear actuator elements take advantage of miniaturization and thereby obtain a large force to volume and/or weight ratio. In one prior art structure, two arrays of parallel planes are interleaved and linear motion is generated by sliding the alternate planes relative to each other using commutated electrostatic forces. With this structure it is difficult to maintain alignment during operation and sliding friction reduces efficiency. In addition, because of the small forces and velocities obtained with miniature actuators it is highly advantageous for such actuators to be easily concatenated in series and parallel structures.

Miniaturized actuators are also of particular interest for space environment applications. The extreme conditions of the environment of space and the low weight requirements of space applications create the need for actuators with very high force-to-weight ratios and for actuators which can function efficiently in a vacuum.

It is accordingly an object of this invention to provide a novel electric actuator suitable for microfabrication which makes maximum use of static frictional forces.

It is another object of the invention to provide a novel miniature electrostatic linear actuator utilizing switched electric fields to drive a flexible linear rotor element between two parallel stators with a perpendicular to parallel motion which effectively utilizes static friction to enhance linear force.

It is another object of the invention to provide a novel miniature electrostatic linear actuator suitable for parallel and series concatenation.

It is another object of the invention to provide a novel miniature electrostatic linear actuator suitable for use in space which is particularly efficient in the vacuum of space.

Briefly, according to one embodiment of the invention, an electric linear actuator is provided having a flexible rotor maintained at a predetermined potential disposed between two substantially parallel stators. Each stator has a set of electrodes disposed on facing surfaces and a driver circuit is coupled to the electrodes to apply drive voltages to each electrode in sequence. In this way the rotor is progressively transferred between the stators to provide a motion parallel to the stators. A plurality of actuators comprising a plurality of stators and rotors can be combined in series and parallel to form concatenated structures.

BRIEF DESCRIPTION OF THE DRAWINGS

The invention, together with further objects and advantages thereof, may be understood by reference of the following description taken in conjunction with the accompanying drawings.

FIG. 1 is a side view illustration of the fundamental structure of a specific embodiment of an electric linear actuator according to the invention.

FIGS. 2A–2G are a set of side view illustrations demonstrating the fundamental operation of a specific embodiment of an electric linear actuator according to the invention.

FIG. 2H is a diagrammatic illustration of the principle of perpendicular to parallel motion generation by rotor progressive transfer.

FIG. 3A is a diagrammatic view of the upper and lower stator electrode structure of a specific embodiment of an electric linear actuator according to the invention.

FIG. 3B is a set of voltage versus time graphs showing a typical voltage condition at the beginning of a rotor progressive transfer for a specific embodiment of the electric linear actuator of FIG. 3A according to the invention.

FIG. 3C is a voltage versus distance graph illustrating a typical voltage condition at the beginning of a rotor progressive transfer for a specific embodiment of the electric linear actuator of FIG. 3A according to the invention.

FIG. 4A is a top view illustration of the rotor and stator structure of a specific embodiment of an electric linear actuator according to the invention.

FIG. 4B is a top view illustration of the rotor and stator structure of a specific embodiment of the electric linear actuator according to the invention.

FIG. 5 is an illustration of an alternative embodiment of a screen-like rotor structure for a specific embodiment of the electric linear actuator according to the invention.

FIG. 6 is an illustration of a specific embodiment of an assembled electric linear actuator according to the invention.

FIG. 7A is a side view illustration of a specific embodiment of a series concatenation structure according to the invention.

FIG. 7B is a top view illustration of a specific embodiment of a rotor structure for the structure illustrated in FIG. 7A.

FIG. 8A is a wide illustration of a specific embodiment of a parallel concatenation structure according to the invention.

FIG. 8B is a side view illustration of a specific embodiment of a single series parallel concatenation structure according to the invention.

FIG. 9 is a side view illustration of a specific embodiment of a series-parallel concatenation structure according to the invention.

FIG. 10 is a side view illustration of the fundamental structure of another specific embodiment of an electric linear actuator according to the invention.

FIG. 11 is a set of voltage versus time graphs illustrating typical drive signals for the specific embodiment of the electric linear actuator of FIG. 10 according to the invention.

FIG. 12 is a front view illustrating a specific embodiment of the electric linear actuator of FIG. 10 according to the invention.

FIG. 13 is a top view illustration of a rotor structure for the specific embodiment of the electric linear actuator of FIG. 10 according to the invention.

FIG. 14 is a side view illustration of a specific embodiment of a series concatenation structure for the specific embodiment of the electric linear actuator of FIG. 10 according to the invention.

FIG. 15 is a top view illustration of a rotor structure for the specific embodiment of the electric linear actuator of FIG. 14 according to the invention.

FIG. 16 is a side view illustration of the fundamental structure of another specific embodiment of a commutated electric linear actuator according to the invention.

FIG. 17 is a top view illustration of a rotor structure for the specific embodiment of the electric linear actuator of FIG. 16 according to the invention.

DETAILED DESCRIPTION OF THE INVENTION

FIG. 1 is an illustration of a side view of the fundamental structure of a specific embodiment of an electric linear actuator 20 according to the invention. The actuator 20 comprises an upper stator substrate 22 and a lower stator substrate 24 configured in parallel to provide a rotor cavity 21, as shown. An upper array of conductive electrodes 26 is provided on the inner surface of the upper substrate 22 and a lower array of conductive electrodes 28 is provided on the inner surface of the lower substrate 24. These electrode arrays 26, 28 may be aligned so that each lower electrode is vertically aligned with a corresponding upper electrode, as shown in FIG. 1, or the electrode arrays may be offset relative to each other. Each of the electrode arrays 26, 28 is covered with an insulating layer 30 and 32, as shown. Also arranged between the stator substrates 22, 24 is a flexible rotor element 34 comprising, in the illustrated embodiment, a flexible element 36 covered with a thin conductive layer 38, as shown. The rotor element 34 may also be composed of a single flexible conductive material or any other combination of materials to provide a flexible, conductive element. Also connected to the rotor 34 is a load extension 39 for connection to a load.

In an example of one embodiment the stator substrate 22 may comprise a flexible, one mil thick sheet of polyimide (e.g. such as that sold under the trade name KAPTON by DUPONT Corp.) while the rotor may comprise a one mil thick film of polyimide (e.g. marketed by DUPONT Corp.) approximately ⅛ inch wide and 1-10 mm in length covered with a 0.05 micron layer of gold conductor. The electrodes may be formed of a thin (e.g. approximately 0.1 micron) layer of conductor such as copper, gold or aluminum covered with a layer of insulator, such as a thin polyamide film (e.g. ten microns). The stator substrates 22, 24 may be arranged, for example, to form a one mil gap between the insulating films 30, 32. The voltage used for the electrode drive voltage is, for example, three hundred volts in the illustrated embodiment. The electric actuator 20 may also be fabricated using silicon for the substrate and using microelectronic photolithographic techniques (i.e. integrated circuit fabrication techniques) to fabricate actuators in accordance with the invention. Such fabrication techniques permit dimensions at least one order of magnitude smaller than the above described embodiment. In addition, using such integrated circuit techniques some of the control circuitry may be integrated into the actuator itself reducing the need for external drive electronics. It should be noted that the figures cannot be shown to scale because with actual dimensions the electric actuators of the invention are very thin but relatively long.

FIGS. 2A-2G illustrate a sequence of side views showing the manner in which a structure such as the actuator 20 of FIG. 1 generates parallel motion from perpendicular motion of the rotor (i.e. perpendicular to parallel motion) by a progressive transfer of the rotor 34 from one stator to the other. Beginning with FIG. 2A the rotor 34 is shown resting fully on the lower stator 24. Typically, in this state of the rotor 34, the lower electrodes 28 will be at a high positive potential (e.g. 300 volts) and the upper electrodes at a low potential (e.g. ground). The rotor 34 is grounded or otherwise maintained at a constant potential. As shown in FIG. 2B, motion may be initiated by switching the voltage across the left most electrodes 26a, 28a of the array of upper and lower electrodes 26, 28 so as to create an attractive electromagnetic field (i.e. an electrostatic field in the illustrated embodiment) lifting the right end of the rotor 34 and bending it toward the upper substrate 22, as shown. A short time period later, the voltage is switched on the next pair of electrodes to the right 26b, 28b to further lift the left end of the rotor 34 and bring it in contact with the upper stator substrate 22, as shown in FIG. 2C. As illustrated by FIG. 2D, the rotor 34 is further lifted into contact with the upper stator substrate 22 by energizing in sequence the electrodes 26C, 28C and 26D, 28D until the rotor has been fully moved to the upper substrate as shown in FIG. 2F by the progressive transfer motion. The rotor 34 is thus transferred from the bottom stator substrate 24 to top stator substrate 22 in a progressive manner which results in the rotor also moving slightly to the right (i.e. parallel to the stator substrate) as shown in FIGS. 2A-2F. This motion is hereby defined as "progressive transfer" motion. Progressive transfer can also be generated using magnetic fields instead of electric fields, for example, using a ferromagnetic rotor and electromagnets instead of electrodes.

This process of progressive transfer of the rotor 34 may then be repeated to progressively transfer the rotor 34 back to the lower substrate 24 as illustrated by FIG. 2G. As a result the rotor 34 may be moved in a direction parallel to the stator substrate (in the illustrated embodiment, to the right) a small amount with each transfer. This provides a continuing back and forth transfer with a continuing parallel motion resulting from the perpendicular motion between the stators. The fact that at least a portion of the rotor surface is always held in contact with one of the stator surfaces takes full advantage of high coefficients of friction to provide a high frictional force which can be coupled to the load via the extension 39. This frictional force may be increased by creating small grooves (not shown) in the surface of the insulating layers 30, 32 and/or the surface of the rotor 34. In one embodiment, the progressive transfer process at one end of the rotor can begin before the progressive transfer is completed at the other end of the rotor resulting in a wave or wiggle motion of the rotor and in increased speed of the parallel motion of the rotor 34. Typical obtainable velocities for the embodiment of FIG. 1 are in the range of 1 mm/sec.

The amount of parallel movement is dependent upon such factors as the angle of curvature when the rotor is first bent toward the opposite stator, the spacing between the stators, and other dimensional factors. Thus, illustrated in FIG. 2H, when the left end of the rotor 34 is bent up from the lower stator to contact the upper stator the point of contact on the upper stator surface 23 is offset to the right by an offset distance a. This offset distance is retained as the rest of the rotor 34 is progressively transferred to the upper stator surface 23. Although the offset distance a is small, repeated transfers result in substantial motion. The offset distance a is dependent upon the angle of rotor curvature and thus is dependent upon the length of the rotor that is initial bent (L) and upon the distance (d) between the upper stator surface 23 and the top of the rotor 34. Thus the offset a is given approximately by the equation $a = d^2/2L$.

The maximum rate at which the rotor can be transferred between stators is determined by such factors as the inertial mass of the rotor, dimensions (gap size (d), rotor thickness, etc.) and other factors which affect L (e.g. rotor stiffness), and viscous damping when the actuator is operated in an environment in which gases such as air are present. Since a vacuum environment eliminates viscous damping the actuator is ideally suited for the vacuum conditions of space applications because greatest efficiency can be achieved by elimination of air damping. This air damping effect can also be reduced by use of a rotor with minimal surface area including screen-like rotor structures with holes formed in the rotor, and by use of grooves etched in the rotor and/or stator to provide an escape path for the air. Such grooves, screen-like structures, and vacuum conditions, by reducing air damping, also permit use of wider rotors to provide increased frictional force (i.e. a narrower rotor reduces air damping but also reduces the fraction force between the rotor and stator). Air also increases arcing (which can further depend on the dielectric breakdown characteristics of the materials used to fabricate the actuator) which could limit the maximum usable drive voltage for a given structure. A high voltage is desirable to maximize the force generated (i.e. maximize the electrostatic fields) and decrease L without generating such excessive arcing as would damage the rotor or stator.

Referring now to FIG. 3A there is illustrated a specific embodiment of a stator electrode array structure 40 for use in the structures of FIGS. 1 and 2A-2G, including upper stator electrode array 26, lower stator electrode array 28, coupled as shown to a signal generator 42. The stator electrode arrays 26, 28 may be composed of any number of electrode pairs (e.g. 26a and 28a, etc.) each of which is coupled to the signal generator 42 (i.e. a switching circuit) which generates a predetermined voltage waveform (i.e. drive signal) for each electrode. The waveform is coupled to the corresponding electrode to provide the sequential electromotive force necessary to generate progressive transfer motion of the rotor 34. The signal generator 42 in the illustrated embodiment is a conventional transistor switching circuit, such as are well known in the art, configured to generate 0–300 volt drive voltage waveforms as described hereinafter with reference to FIGS. 3B and 3C.

FIG. 3B illustrates a set of voltage versus time graphs showing a typical voltage waveform sequence (i.e. a sequence of out of phase rectangular waveforms) for the specific stator electrode array of FIG. 3A. Thus, the potential for all the upper electrodes 26a-f is initially positive and the potential for the bottom electrodes 28a-f is zero (i.e. ground) or negative. This corresponds to the state of a state with the rotor 34 on the upper stator. A voltage of +300 volts and zero volts is utilized on the illustrated embodiment but a wide variety of voltages may be used depending upon such factors as the materials used and the size of the elements and their spacing. To progressively transfer the rotor from the upper stator substrate to the lower stator substrate, the electrodes 26a, 28a are switched first so that the top electrode 26a is low and the bottom electrode 28a is at the high potential at time $t_0$ as shown by graph 50. At the same point in time $t_0$ all the other electrodes remain unchanged (see graphs 52–60). A short time later, at time $t_1$ the next electrode pair 26b, 28b is switched as illustrated by graph 52 and subsequently each electrode pair is switched in sequence as illustrated by graphs 54–60. As can be seen in graph 50, the progressive transfer of the rotor 34 back to the lower substrate 24 is begun at some later point in time when the voltage across the electrodes 26a, 28a are again switched (to the opposite voltage polarity) and the sequence for each electrode pair is repeated.

The lower electrodes may be switched at a different time than the corresponding upper electrodes. For example, the lower electrode 28a, and subsequently, the other electrodes, may be switched slightly earlier than the corresponding upper electrode 26a (i.e. slightly earlier than $t_0$). This offset can be used to increase the angle of curve of the rotor when it is bent toward the lower electrode, decreasing L thereby increasing a and increasing maximum attainable velocity. To take full advantage of rotor flexibility (the rotor should be flexible enough to permit the electrostatic forces to bend the rotor) the attracting electrodes may be activated several electrode positions ahead of the electrodes to be deactivated. The rate at which the waveform of FIG. 3C moves along the electrodes is also limited by the rotor flexibility. If too many electrodes are switched before the end of the rotor can move to the opposite stator, a large segment of rotor will bend to the opposite stator all at once (i.e. increasing L) reducing the rotor offset distance a and thereby reducing rotor velocity. The limiting rate is determined by such factors as dimensions and materials. An increase in velocity can be obtained by having more than one switching sequence along the length of a rotor so that the front end of the rotor begins to transfer before the back end of the rotor has completed the previous transfer.

FIG. 3C is a voltage versus distance graph illustrating a voltage condition for the beginning of a rotor progressive transfer for the embodiment of FIG. 3A. As shown, the potential for the top electrode 26a is low (e.g. ground) and the potential for the bottom electrode 28a is high (e.g. 300 v) while the opposite voltage polarity is used for the electrodes 26b-f and 28b-f thereby forming a pair of voltage versus distance rectangular waveforms. As time progresses, these waveforms move along the stator electrode array in correspondence with the progressive physical transfer of the rotor 34.

Referring now to FIG. 4A there is shown a top view illustration of a rotor structure 62 and a stator structure including an electrode array 64 for a specific embodiment of an electric linear actuator according to the invention. The rotor 62 comprises a flexible conductive element including two flexible rotor side extensions 66 and 68 and further includes a load coupling extension 69 which couples the rotor 62 to an external load. Only the lower stator electrode array 64 is shown in full wherein an upper stator electrode array 63 would be formed identically but above the rotor 62. In operation the electrodes of array 64 would be sequentially activated to move the rotor 62 with a progressive transfer motion thereby pushing or pulling a load attached to the extension 69. An alternative structure is illustrated in FIG. 4B wherein the electrodes 64 of FIG. 4A may be divided into two sets of electrode arrays 64a and 64b each of which would have an identical set of corresponding electrode arrays 63 on the upper stator substrate. Each pair of divided electrodes 64a and 64b is identically activated to provide separate but identical progressive transfer movement of the rotor side extensions 66 and 68. The flexible side extensions 66, 68 permit the start of a progressive transfer on the left end of the rotor 62 without having to overcome the effect of the load. Thus, the extension 66, 68 can be freely transferred by attraction to the opposite stator without the resistance of the load and the load can then be pulled as the transfer progresses. If the load is attached to the rotor end which begins the transfer, the electrostatic field must overcome the pull of the load at the point when the initial gap between rotor and stator is greatest and thus the electrostatic field is weakest. This is avoided by the rotor embodiments of FIGS. 4A and 4B.

The flexible rotor of this invention may be composed of any material formed into a structure which provides a thin conductive, flexible element capable of withstanding repeated flexing. In one embodiment, the rotor comprises a thin plastic (e.g. polyester or polyamide) film with a layer of conductive material on both flat sides. Another embodiment of the rotor which reduces air damping and inertial limitations comprises a thin conductive sheet of electroformed nickel (e.g. marketed by Buckbee-Mears) having an array of perforations thus forming a screen-like rotor element such as the rotor 71 illustrated in FIG. 5. In still another embodiment the rotor may comprise a thin conductive film covered with a thin insulating film thereby eliminating the need to insulate the stator electrodes.

FIG. 6 is an illustration of a specific embodiment of an assembled electric linear actuator 80 according to the invention which utilizes printed circuit boards 82, 84 as shown to form upper and lower stator substrates. In the illustrated embodiment, spacers 86, 88 (e.g. composed of mylar marketed by Dupont Corp.) are clamped between the pc boards to form an elongated rotor cavity 90, as shown. A set of pins or clamps 92 hold the pc boards together to create a substantially rigid structure forming the rotor cavity 90, a set of electrodes are printed on the portion of each of the pc boards 82, 84 that form the upper and lower inner surface of the cavity in accordance with the electrode structure illustrated in FIG. 3A. Also printed on each board is a lead from each electrode to a set of connectors 94, 96 to permit coupling the drive signals to the electrodes. Thus, within the cavity 90, an upper and a lower set of electrodes are printed on the pc boards 82, 84 to which voltage signals can be coupled via the connectors 94, 96. In addition, in one embodiment, the electrodes may be covered with a thin insulating layer to insulate them from the rotor while in an alternative embodiment the surface of the rotor surface may be an insulator.

To complete the linear actuator 80, a rotor such as that illustrated in FIG. 4A is configured within the elongated rotor cavity 90. In operation, the rotor can be moved in either direction along the axis 91 of the rotor cavity 90 by the application of drive voltages as shown and described hereinbefore in conjunction with FIGS. 3A-3C.

Referring now to FIG. 7A there is shown a side view of a series concatenation structure 100 which as shown is composed of two linear actuators coupled in series. The structure 100 includes a rotor 102 and stator structure 104, a rotor 106 and stator structure 108, and a common load extension element 110, configured as shown. On each of the upper and lower inside surfaces of stators 104, 108 a set of electrodes 112 are located for driving the rotors 102, 106. A top view of one embodiment of a combined rotor structure for the structure 100 is illustrated in FIG. 7B. In operation, when the proper sequence of drive voltages (as illustrated in FIG. 3A-3C) is applied to the electrodes 112, the stator structures 104, 108 can be moved toward each other or away from each other by the progressive transfer of the rotors 102, 106. The drive voltage can be applied to the electrodes of each of the stators simultaneously or independently. This series concatenated structure provides a common force configuration which generates an increase (i.e. doubling in the embodiment illustrated) of the speed of motion (i.e. velocity) over that which can be generated by one actuator. Additional series structures 100 can be coupled together in series to provide higher levels of series concatenation with a corresponding increase in attainable velocity.

FIG. 8A illustrates a specific embodiment of a parallel concatenated structure 114 in which a plurality of individual actuators are coupled in parallel, as shown. In the illustrated embodiment only four actuators are shown although virtually any number of actuators can be concatenated in accordance with the invention. Each individual actuator comprises a structure 115 which forms a rotor cavity 116, and rotors 117 with load extensions 118 (e.g. such as the rotor 62 illustrated in FIG. 4A) coupled to a common load coupling 119. A set of electrodes located on the inner surface of the rotor cavity 116 permit application of drive voltages to drive each of the rotors 117. In operation, drive voltages are applied to the electrodes causing the rotors 117 to move together parallel to the stators by the progressive transfer of the rotors 117. Thus, this parallel concatenated structure provides a common velocity structure in which the plurality of actuators move together sharing a common velocity. This increases the force attainable by a summing of the forces provided by the individual actuators.

FIG. 8B illustrates a specific embodiment of a simple series parallel concatenated structure 120 in which a plurality of individual actuators are coupled in series and parallel, as shown. In the illustrated embodiment only eight actuators are shown although virtually any number of actuators can be concatenated in accordance with the invention. Each individual actuator comprises a stator structure 126 which forms a rotor cavity 128, and a rotor 122 with a load extension 124 (e.g. such as the rotor illustrated in FIG. 4A) coupled to a portion 130 of the stator structure of another of the plurality of individual actuators, as shown. A set of electrodes located on the inner surfaces of the rotor cavity 128 permit application of drive voltages to drive each of the rotors 122. Thus, a parallel structure is formed in series with another parallel structure. In operation, when the drive voltages are applied to the electrodes the stator structures 126 can be moved toward each other or away from each other by the progressive transfer of the rotors 122. This series parallel concatenated structure provides a common force-common velocity structure in which two sets of a plurality of actuators sharing a common velocity are in series with each other. This increases the force attainable by a summing of the forces provided by the individual actuators and doubles the velocity obtainable by summing the velocity of the two parallel structures.

FIG. 9 is a side view illustration of a specific embodiment of another embodiment of a more complex combination series parallel concatenated actuator structure 140 in which a plurality of electric actuators in accordance with the invention are coupled in series and in parallel, as shown. Virtually any number of actuators may be concatenated as illustrated in FIG. 9. Each actuator comprises a stator structure 142 which forms a rotor cavity 144 within which a rotor structure 146 is located (the rotor structure may, for example, be like that shown in FIG. 7B). Thus a number of columns of parallel actuators are formed comparable to the parallel structure shown in FIG. 8. The columns of parallel actuators are arranged next to each other and coupled together to form rows of series connected actuators. The actuators may be constructed individually and coupled together or may be formed integrally as illustrated in FIG. 9. The resulting series-parallel concatenated structure provides an increase of both force and velocity. The structure may be used to construct, for example, artificial muscles mimicking the series-parallel cell structure of biological muscle tissue. Many other series and parallel concatenated combinations of the electric actuator according to the invention are also possible.

Referring now to FIG. 10 there is shown a side view of an alternative embodiment of an electric actuator 150. A rotor 152, having a set of electrodes 154, 156, 158, 160 configured on the surface of the rotor 152, is located between substantially parallel upper and lower stator substrates 162, 164, as shown. Thin conductive films 166 covered with insulating layers 168 are configured on the facing surfaces of each stator substrate 162, 164 to form a stator as shown. A load attachment extension 170 may extend, as shown, from the rotor 152 to permit attachment to a load. While a wide variety of materials and dimensions may be used, for example, the stator substrates 162, 164, the rotor 152, the conductive stator films 166 and the insulating layers 168 may be constructed of materials and with dimensions as previously described with regard to FIG. 1. Alternatively, the rotor electrodes may be covered with insulator and the stator conductive film could then be insulated or not insulated.

In operation, the rotor 152 may be moved in either direction parallel to the stator substrates 162, 164 by progressive transfer from one stator to the other. This progressive transfer is performed by sequentially switching drive voltages applied to the electrodes 154, 156, 158, 160 to move first one end of the rotor 152 and then the other end to the opposite stator surface. In the illustrated embodiment, the stator conductive layers 166 are at a constant potential (e.g. ground). The direction of the rotor 152 is determined by which end of the rotor is moved to the opposite stator first. For example, the rotor 152 will move to the right in FIG. 9 if the left end is moved first and to the left if the right end is moved first. Once the rotor 152 is fully moved to the opposite stator, the process can be repeated starting each progressive transfer with the same end of the rotor in order to provide continual motion in one direction until the rotor reaches the end of the stator conductive layers 166. The rotor 152 may have more than the two sets of electrodes shown.

FIG. 11 is a pair of voltage vs. time graphs illustrating one example of typical voltage drive signals for the specific embodiment of FIG. 10 wherein $V_1$ is the drive voltage for the left upper electrode 154 and $V_2$ is the drive voltage for the right upper electrode 158. $V_1$ is a low potential (e.g. ground) on the top electrode 154 and $V_2$ is a high potential (e.g. 300 v) on the bottom electrode 156 with the opposite voltages on the corresponding electrodes 158, 160 when the rotor is in the status shown in FIG. 10 (i.e. left end down, right end up). A short time later, as shown in FIG. 11, the voltages on the electrodes 154, 156 are switched such that the $V_1$ (see graph 172) is at the high potential with the result that the top left electrode 154 is attracted to the upper stator conductor 166 pulling the rotor 152 up until it is completely transferred to the upper stator substrate 162. Next the voltage on the electrodes 158, 160 are switched such that the upper left electrode 158 voltage $V_1$ is at the low potential (see graph 174) and the lower left electrode 160 is at the high potential while the voltage on the other two electrodes 154, 156 are temporarily maintained. This causes the right end of the rotor 152 to bend down toward the lower stator substrate 164. The electrodes 154, 156 are then switched to the opposite state with the electrode 154 low (i.e. $V_1$ = ground) to transfer the left end of the rotor 152 to the lower stator substrate 164. This process is repeated to provide continuing motion of the rotor 152 to the left while motion to the right can be generated by starting each progressive transfer at the left end of the rotor 152. Thus, the waveforms for the drive voltages for each electrode are rectangular or square waveforms which are out of phase with the waveform of the adjacent electrode.

FIG. 12 is a front view illustrating a specific embodiment of stator structure 180 including a conductive substrate 182 (e.g. doped silicon) which may be multiple separate sections joined as shown or may be one integral substrate. The substrate structure 180 may be configured, as shown, to form a rotor cavity 184 having, for example, dimensions of 50 microns height, 1 cm width and 10 cm length. The dimensions however may range to much smaller values (e.g. 1 micron in height and width and 1 mm length). An upper insulating layer 186 (e.g. polyamide) and a lower insulating layer 188 are provided on the upper and lower surfaces of the rotor cavity 184 respectively. In a complete actuator, a rotor is located within the rotor cavity 184.

FIG. 13 is a top view illustration of a specific embodiment of a rotor 190 suitable for use in the rotor cavity 184 of FIG. 12. The rotor 190 includes a flexible dielectric substrate 192 (e.g. polyamide or polyester) on which a set of thin conductive electrodes (e.g. vacuum deposited gold, 0.1 micron thick) 194, 196 is formed. A narrow U-shaped open region 198 is formed around three sides of the electrode 194, as shown, to permit the region of the substrate 192 on which the electrode 194 is formed to bend away from the plane of the substrate 192. Thus the electrodes 194 and 196 form two flexible regions which permit progressive transfer of the regions between opposing stator surfaces. An extended portion 200 of the rotor 190 forms a load extension and includes conductive lines 202 which permit coupling of voltage drive signals to the electrodes 194, 196 which can be applied via input connection lands 204. Two substantially identical electrodes (not shown) are formed on the opposite side of the rotor 190 to form a complete rotor with four electrodes including associated conductors 202 and lands 204 to permit application of the required drive voltages to the electrodes.

Referring to FIG. 14 there is shown a side view of a specific embodiment of a series concatenated structure 210 composed of two series connected actuators of the type illustrated in FIG. 10. The structure 210 includes a rotor 212 and an associated stator structure 214, a rotor 216 and an associated stator structure 218 and a connecting element 220 configured as shown. On rotor 212 is located a set of four electrodes 222 and on the rotor 214 is located another set of four electrode 224 arranged as shown in FIG. 10. The upper and lower inside surfaces of the stator structures 214, 218 each comprise a thin conductive layer covered with an insulating layer such as illustrated on the stators 162, 164 of FIG. 10. One embodiment of a rotor structure suitable for use in the series concatenated structure 210 is illustrated in FIG. 15 using corresponding reference numerals. In FIG. 15 the electrodes 224 and the electrodes 222 are formed similarly to the electrode 194, 196 of FIG. 13 with a variation in shape as shown and including appropriate U-shaped regions 232, 234. Conductors 232, 234 are provided to permit coupling of drive voltages from a center contact point 240 to the electrodes 222, 224. The opposite side of the rotor structure is configured similarly to provide four electrodes for each set of the electrodes 222, 224.

The series concatenated structure of FIG. 14 can be operated by coupling the proper sequence of drive voltage, as previously described with reference to FIG. 10, to each set of electrodes 222, 224. This generates progressive transfer for the rotors 212, 216 between the upper and lower inside surfaces of the stator structure stators 214, 218 thereby moving the stator structures 214, 218 toward or away from each other. Thus, this series concatenated structure provides a common force configuration which generates an increase in attainable velocity. Parallel concatenated structure may also be constructed, for example, by stacking a plurality of the structures 210 of FIG. 14 vertically, coupled together to provide a common velocity structure. Series-parallel concatenated structures may also be formed, for example, by using the structure 210 of FIG. 14 as a basic cell in a combined series-parallel structure such a that illustrated in FIG. 9.

FIG. 16 is a side view illustration of a specific embodiment of a commutated electric linear actuator 272 having a flexible rotor 270 positioned between two stator substrates 256, 258, as shown. The rotor comprises a flexible substrate 260 with a set of electrodes 266, 268 configured on the substrate surface and an insulating layer 269 covering the electrodes 268, 266. Exposed above the insulating layer 269 is a set of commutating electrodes 262, 264 (i.e. contacts) for sensing the position of the rotor 270. A conductive film 254 is configured on the facing surfaces of each stator substrate 256, 258 to form the stators, as shown. A load attachment extension 271 may extend from the rotor 270 to permit attachment to a load. A wide variety of materials and dimensions may be used as described with regard to the embodiments previously described herein.

In operation, the rotor 270 may be moved in either direction parallel to the stator substrates 256, 258 by progressive transfer. The progressive transfer is performed generally as previously described with reference to FIG. 10 except that the drive voltages are switched based upon sensing the position of the rotor by detecting the shorting of the contacts 262, 264 with the conductive films 254. When a contact/conductive film switch closes, this provides a signal used to switch the drive voltages on the appropriate electrode in a conventional commutation process. This actuator 272 provides for commutation by permitting sensing of the position of rotor by means of the contacts 262, 264. The sensed position is then used to determine the switching of the drive voltages. The sensing of position may be providing by many sensing means including contact or proximity switches.

A specific embodiment of a rotor 241 suitable for use in the actuator 272 of FIG. 16 is shown in FIG. 17 in a top view illustration. The rotor 241 includes a flexible dielectric substrate 243 (e.g., polyamide or polyester) on which a set of thin conductive electrodes (e.g., 0.1 micron gold film) 242, 244 is formed with an insulating layer on them (not shown). A narrow U-shaped open region 250 is formed around three sides of the electrode 242, as shown, to permit the region of the substrate 243 on which the electrode 242 is formed to bend away from the plane of the substrate 243. Thus, the electrodes 242, 244 form two flexible regions which permit progressive transfer. A set of thin commutating electrodes (contacts) 246, 248 are provided next to electrodes 242, 244 to provide position sensing contacts. An extended position of the substrate 243 forms a load extension and includes conductive lines which permit coupling of drive voltages to the electrodes 242, 244 which can be applied via input connection lands 252, as shown. Substantially identical structure is formed on the opposite face of rotor 241 to form a complete rotor.

Specific embodiments of the novel electric linear actuator according to the invention have been described for the purpose of illustrating the manner in which the invention may be made and used. It should be understood that implementation of other variations and modifications of the invention in its various aspects will be apparent to those skilled in the art and that the invention is not limited thereto by the specific embodiments described. It is therefore contemplated to cover by the present invention any and all modifications, variations or equivalents that fall within the true spirit and scope of the underlying principles disclosed and claimed herein.

What is claimed is:

1. An electric linear actuator comprising:
   a plurality of substantially parallel stators;
   a flexible rotor disposed between at least two of the plurality of a substantially parallel stators; and
   a signal generator to generate a sequence of drive signals to generate electromagnetic fields between the stators and the rotor to effect a progressive transfer of the flexible rotor between the stators such that the rotor is transferred in a progressive manner in a direction substantially perpendicular to the stators from one stator to another stator to produce a motion of the rotor in a direction substantially parallel to the stator to provide a perpendicular to parallel motion.

2. The electric linear actuator of claim 1 wherein each stator has a set of electrodes disposed on a surface facing another one of the substantially parallel plurality of stators and wherein the sequence of drive signals is coupled to the electrodes.

3. The electric linear actuator of claim 2 wherein the flexible rotor comprises a plastic film covered on two sides with a thin conductive layer.

4. The electric linear actuator of claim 2 wherein the flexible rotor comprises a thin flexible sheet having a plurality of perforations forming a screen-like structure.

5. The electric linear actuator of claim 1 wherein the stators are configured in a series structure and a plurality of rotors are disposed between the stators to form a series concatenated structure.

6. The electric linear actuator of claim 1 wherein the plurality of substantially parallel stators are arranged in a series-parallel configuration and a plurality of rotors are arranged in a series-parallel configuration and disposed between the stators to form a series-parallel concatenated structure.

7. The electric linear actuator of claim 2 wherein the rotor comprises a flexible conductive element which is maintained at a constant electrical potential and the signal generator comprises a switching circuit which generates drive signals as a sequence of rectangular voltage waveforms.

8. The electric linear actuator of claim 2 wherein the rotor comprises a central portion coupled to a load extension and to at least one flexible side extension.

9. The electric linear actuator of claim 2 wherein the electrodes are covered with an insulating layer.

10. The electric linear actuator of claim 2 wherein the rotor comprises a thin flexible conductive sheet covered with a layer of insulator.

11. The electric linear actuator of claim 1 wherein the rotor has a set of electrodes disposed thereon and wherein the sequence of drive signals is coupled to the electrodes.

12. The electric linear actuator of claim 11 wherein each of the stator comprises a conductive element maintained at a constant electrical potential and is covered with a thin insulating layer.

13. The electric linear actuator of claim 11 wherein the rotor comprises a thin flexible sheet having a plurality of perforations through the sheet.

14. The electric linear actuator of claim 11 wherein the electrodes are covered with an insulating layer.

15. The electric linear actuator of claim 11 wherein the stators are configured in a series structure and a plurality of rotors are disposed between the stators to form a series concatenated structure.

16. The electric linear actuator of claim 11 wherein the plurality of substantially parallel stators are arranged in a series-parallel configuration and a plurality of rotors are arranged in the series-parallel configuration and disposed between the stators to form a series-parallel concatenated structure.

17. The electric linear actuator of claim 1 further comprising sense means for sensing rotor position and wherein the signal generator comprises commutation means for generating the sequence of drive signals responsive to the sense means.

18. The electric linear actuator of claim 17 wherein the sense means comprises a set of contacts located on the rotor.

19. An electric actuator comprising:
a plurality of substantial parallel stators spaced apart from each other;
a flexible rotor disposed between at least two of the stators; and
means for activating progressive transfer of the rotor between the stators such that the rotor is transferred in a progressive manner in a direction substantially perpendicular to the stator from one stator to another stator to produce a motion of the rotor in a direction substantially parallel to the stators.

* * * * *